United States Patent
Bromley et al.

(10) Patent No.: US 9,003,192 B2
(45) Date of Patent: Apr. 7, 2015

(54) PROTOCOL FOR PROTECTING THIRD PARTY CRYPTOGRAPHIC KEYS

(75) Inventors: Dennis N Bromley, Issaquah, WA (US); Sumedh N Barde, Redmond, WA (US); Quintin S Burns, Fort Mills, SC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1809 days.

(21) Appl. No.: 12/101,132

(22) Filed: Apr. 10, 2008

(65) Prior Publication Data

US 2009/0257597 A1    Oct. 15, 2009

(51) Int. Cl.
*H04L 9/00*    (2006.01)
*H04L 9/08*    (2006.01)

(52) U.S. Cl.
CPC ............ *H04L 9/0825* (2013.01); *H04L 9/0822* (2013.01); *H04L 9/083* (2013.01); *H04L 2209/603* (2013.01)

(58) Field of Classification Search
CPC .... H04L 9/0825; H04L 63/062; H04L 9/0822
USPC ......................................................... 713/171
See application file for complete search history.

(56) References Cited

U.S. PATENT DOCUMENTS

| | | | |
|---|---|---|---|
| 6,192,130 B1 * | 2/2001 | Otway | .......................... 380/277 |
| 6,363,365 B1 | 3/2002 | Kou | |
| 6,381,695 B2 | 4/2002 | Kudo et al. | |
| 6,973,191 B2 | 12/2005 | Audebert et al. | |
| 7,596,784 B2 * | 9/2009 | Abrams et al. | ................ 717/172 |
| 7,793,105 B2 * | 9/2010 | Korkishko et al. | ............ 713/175 |
| 2002/0176583 A1 | 11/2002 | Buttiker | |
| 2003/0163700 A1 | 8/2003 | Paatero | |
| 2004/0103312 A1 | 5/2004 | Messerges et al. | |
| 2004/0268130 A1 | 12/2004 | Pretorius | |
| 2005/0102513 A1 * | 5/2005 | Alve | ............................. 713/168 |
| 2005/0204128 A1 | 9/2005 | Aday et al. | |

OTHER PUBLICATIONS

Wiesmaier et al., "Key Authority—Secure Key Management in Hierarchical Public Key Infrastructures", Oct. 12, 2004, Proceedings of the International Conference on Security and Management. CSREA Press, pp. 5.
"IBE Secure E-mail", retrieved at <<http://crypto.stanford.edu/ibe/>>, pp. 3.
"Third-party Certification Authority Support for Encrypting File System", Microsoft Corporation, 2008, pp. 3.

* cited by examiner

*Primary Examiner* — Andrew Georgandellis
(74) *Attorney, Agent, or Firm* — Julie Kane Akhter; Danielle Johnston-Holmes; Micky Minhas

(57) ABSTRACT

A protocol is provided that permits a third-party key issuing entity to have its issued keys protected by an unrelated key protecting entity. In at least some embodiments, a trusted key protecting entity is injected, in a sense, in a conversation between the third-party key issuing entity and a client to which one or more keys are distributed. The trusted key protecting entity is able to apply various protections which, in at least some embodiments are unknown to the key issuing entity, to a distributed key which can then be used by the client to access protected content.

20 Claims, 6 Drawing Sheets

PROTOCOL FOR PROTECTING THIRD PARTY CRYPTOGRAPHIC KEYS

BACKGROUND

Traditionally, digital rights management or DRM has been used to protect various types of content that can be distributed to users. DRM protections can include using one or more keys to cryptographically protect content that is to be distributed.

Some types of DRM techniques in the past have included two different but related functions—that of key issuance and key protection.

Key issuance involves issuing keys that are used to cryptographically protect content. Key protection involves protecting issued keys to prevent tampering and the like. In the past, in at least some protection systems, the role of key issuer and key protector has been played by a single entity. Thus, the entity associated with issuing keys has also been the entity associated with protecting those keys.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A protocol is provided that permits a third-party key issuing entity to have its issued keys protected by an unrelated key protecting entity. In at least some embodiments, a trusted key protecting entity is injected, in a sense, in a conversation between the third-party key issuing entity and a client to which one or more keys are distributed. The trusted key protecting entity is able to apply various protections which, in at least some embodiments are unknown to the key issuing entity, to a distributed key which can then be used by the client to access protected content.

BRIEF DESCRIPTION OF THE DRAWINGS

The same numbers are used throughout the drawings to reference like features.

DETAILED DESCRIPTION

Overview

A protocol is provided that permits a third-party key issuing entity to have its issued keys protected by an "unrelated" key protecting entity. The notion of "unrelated" can mean, by way of example and not limitation, at least one or more of the following: the key issuing entity is associated with a business entity that is different from and/or unaffiliated with the key protecting entity; the key issuing entity is unaware of the specific protections that can be applied to a key by the key protecting entity; or the key issuing entity is unable to ascertain the protections that are applied by the key protecting entity.

In at least some embodiments, a trusted key protecting entity is injected, in a sense, in a conversation between the third-party key issuing entity and a client to which one or more keys are distributed. The trusted key protecting entity is able to apply various protections which, in at least some embodiments are unknown to the key issuing entity, to a distributed key which can then be used by the client to access protected content.

In the discussion that follows, a section entitled "Operating Environment" describes but one operating environment that can be utilized to practice the inventive principles described herein in accordance with one or more embodiments. Following this, a section entitled "Implementation Example" is provided and describes an example implementation in accordance with one or more embodiments. Following this, a section entitled "Extensions/Modifications" describes various extensions or modifications that can be utilized in accordance with one or more embodiments. Last, a section entitled "Example System" describes an example system that can be utilized to implement one or more embodiments.

Operating Environment

Figure 1:
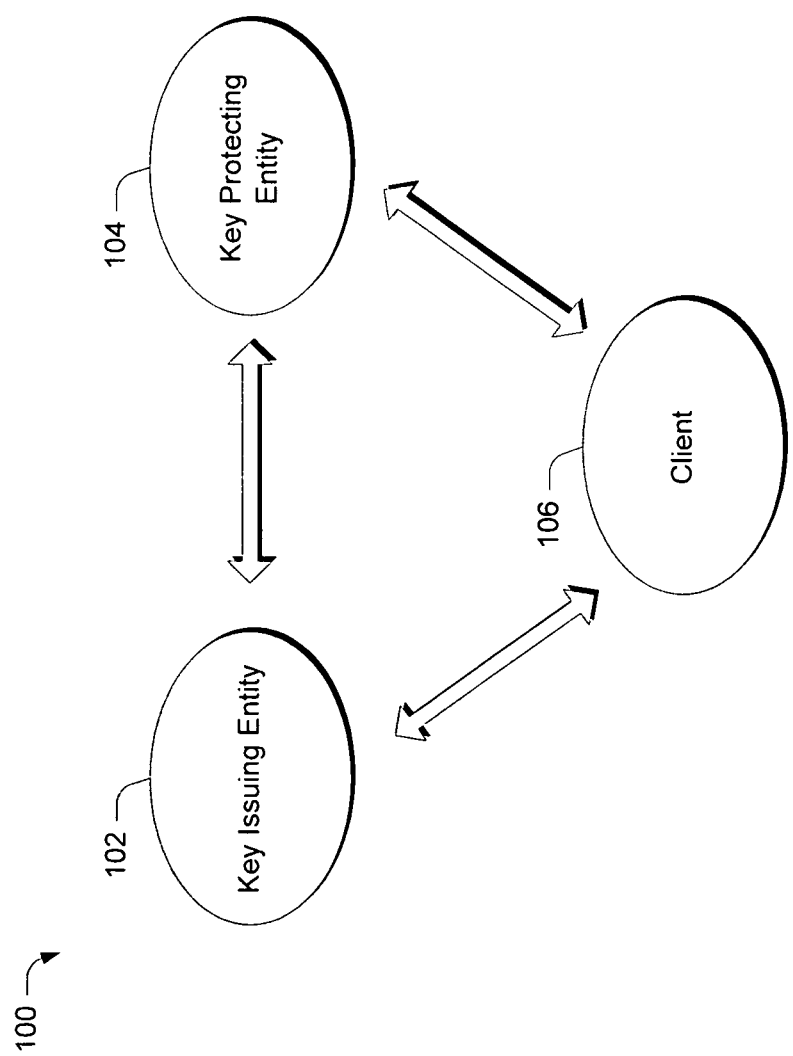
FIG. 1 illustrates an operating environment in accordance with one or more embodiments.

FIG. 1 illustrates an operating environment in accordance with one or more embodiments, generally at 100. In this example, the operating environment 100 includes a key issuing entity 102, a key protecting entity 104, and a client 106.

The key issuing entity 102, key protecting entity 104, and client 106 can be implemented in any suitable hardware, software, firmware, or combination thereof. Further, the key issuing entity 102 and/or key protecting entity 104 can reside on the same computing device as the client 106, or on separate computing devices, such as separate servers.

Alternately or additionally, the key issuing entity 102, key protecting entity 104, and client 106 can be three separate processes or threads running on the same computing device, or three separate function calls within a single thread running on a single computing device. Needless to say, there are a number of different ways or locations at which to implement the described entities and client. As such, the described entities can be implemented in a number of different ways or locations without departing from the spirit and scope of the claimed subject matter. But one example of an implementation of these entities and the client is provided below in a section entitled "Implementation Example".

In various embodiments, operating environment 100 can be used to protect a key—termed in at least some embodiments a "content key"—that has been or will be used to encrypt content that is to be consumed on client 106. In operation, client 106 communicates with key issuing entity 102 and indicates that it wishes to consume content that has been or is to be protected with the content key. Responsive to this communication, the key issuing entity 102 can, in at least some embodiments, protect the content key. As but one example, the key issuing entity can encrypt the content key to a certificate whose private key is held by key protecting entity 104. For example, the key issuing entity can use a public key of key protecting entity 104 to encrypt the content key. At this point, neither key issuing entity 102 nor client 106 can decrypt the content key.

Key issuing entity 102 now sends the content key, e.g. the protected or encrypted content key, to client 106 who can, in turn, send the content key to key protecting entity 104. Upon receiving the content key from client 106, key protecting entity 104 can access the content key as by, for example, decrypting the encrypted content key using its associated private key, apply protections to the content key, and then return the content key to the client. For example, in at least some embodiments, the key protecting entity can encrypt the protected content key using the client's public key, and return (or cause to be returned) the encrypted, protected content key to the client.

When the client 106 receives the protected content key, the client can, in those embodiments where the content key is encrypted, decrypt the encrypted, protected content key and use it to consume encrypted content associated with the protected content key.

In one or more embodiments, protections that are applied to the content key by key protecting entity 104 can comprise any suitable protections that can be applied. For example, such protections can include, by way of example and not limitation, mathematically operating on the key in some way. For example, the key can have a mathematical transform applied to it, such as any arbitrary mathematical transform. Alternately or additionally, the key might be split into different parts and manipulated in some way. Alternately or additionally, the key can be operated upon as by applying any type of cryptographic transform to it. Needless to say, there are simply numerous ways in which the content key can be operated upon to protect it. As such, it is not intended that the claimed subject matter be limited to any one particular protection scheme. Rather, various protection schemes can be used without departing from the spirit and scope of the claimed subject matter.

In at least some embodiments, software executing on client 106 is knowledgeable of the protections that are applied by key protecting entity 104. As such, when the protected content key is received from the key protecting entity 104, client software can access the protected content key as by, for example, decrypting the protected content key and reversing the protections that were applied by key protecting entity 104. In these embodiments where client software is knowledgeable of the protections that are applied by the key protecting entity 104, the software on the client can be easily updated to reflect changes in software associated with key protecting entity 104 that is used to protect content keys. For example, if the key protecting entity 104 upgrades its protection software, updates can be sent to the client so that the client can reverse the protections that are applied by the key protecting entity. This can relieve the key issuing entity 102 from having to update protection software. Thus, the key issuing entity 102 can continue to conveniently issue keys without being concerned about the specific protections that are applied by the key protecting entity.

Figure 2:
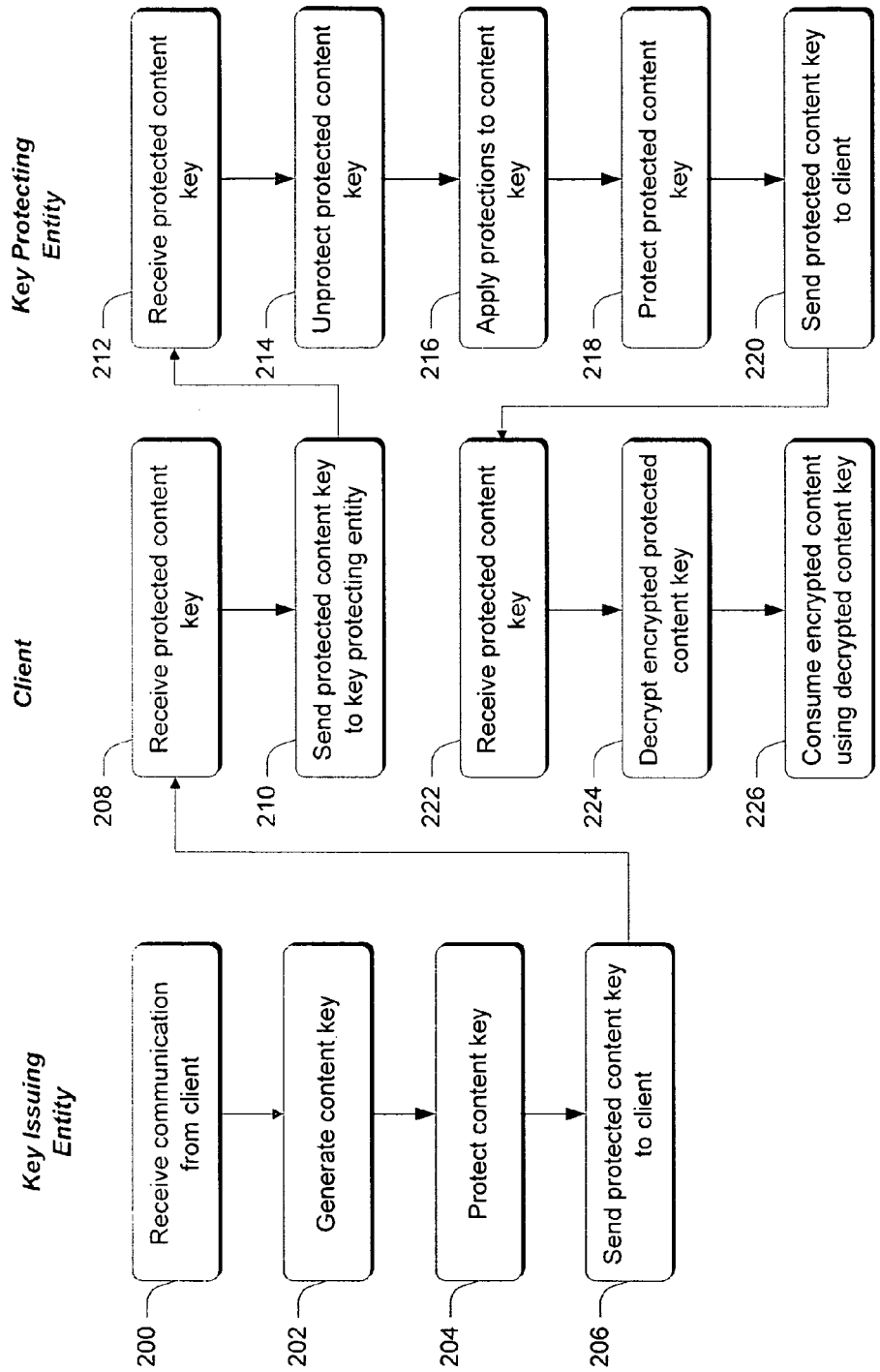
FIG. 2 illustrates a flow diagram that describes steps in the method in accordance with one or more embodiments.

FIG. 2 illustrates a flow diagram that describes steps in the method in accordance with one or more embodiments. The method can be implemented in connection with any suitable hardware, software, firmware, or combination thereof. In the description that follows, various steps of the method can be implemented or performed by various entities such as a key issuing entity, a client, and a key protecting entity. Accordingly, the various steps or acts that can be performed by these entities appear under similar designations in the flow diagram.

Step 200 receives a communication from the client indicating that the client wishes to consume content that has been protected or will be protected by a particular content key. Step 202 generates or otherwise obtains a content key. Step 204 protects the content key in some way. For example, in at least some embodiments, the content key can be encrypted. This step can be performed in any suitable way. For example, this step can be performed by encrypting a content key using a public key of the key protecting entity. Step 206 sends the protected content key to the client.

Step 208 receives the protected, e.g., the encrypted content key and step 210 sends the protected content key to the key protecting entity.

Step 212 receives the protected content key. Step 214 unprotects, e.g., decrypts, the protected content key. In those embodiments where the content key is encrypted, this step can be performed by using, for example, a private key associated with a public key with which the content key was encrypted. Step 216 applies protections to the content key. Examples of various protection schemes are provided above. Once the protections are applied to the content key, the protected content key can be returned to the client in any suitable way. For example, in at least some embodiments, step 218 can protect, for example by encryption, the protected content key. In those embodiments where the protected content key is protected through encryption, the key can be protected using, for example, a public key associated with the client. Step 220 can then send the protected content key to the client.

In those embodiments in which the protected content key has been encrypted, step 222 receives the encrypted protected content key. Step 224 decrypts the encrypted protected content key. This step can include reversing any protections that were applied by the key protecting entity at step 216. Step 226 then consumes encrypted content using the decrypted content key.

Having discussed a general operating environment and how a content key can be protected in such environment in accordance with one or more embodiments, consider now an implementation example.

Implementation Example

Figure 3:
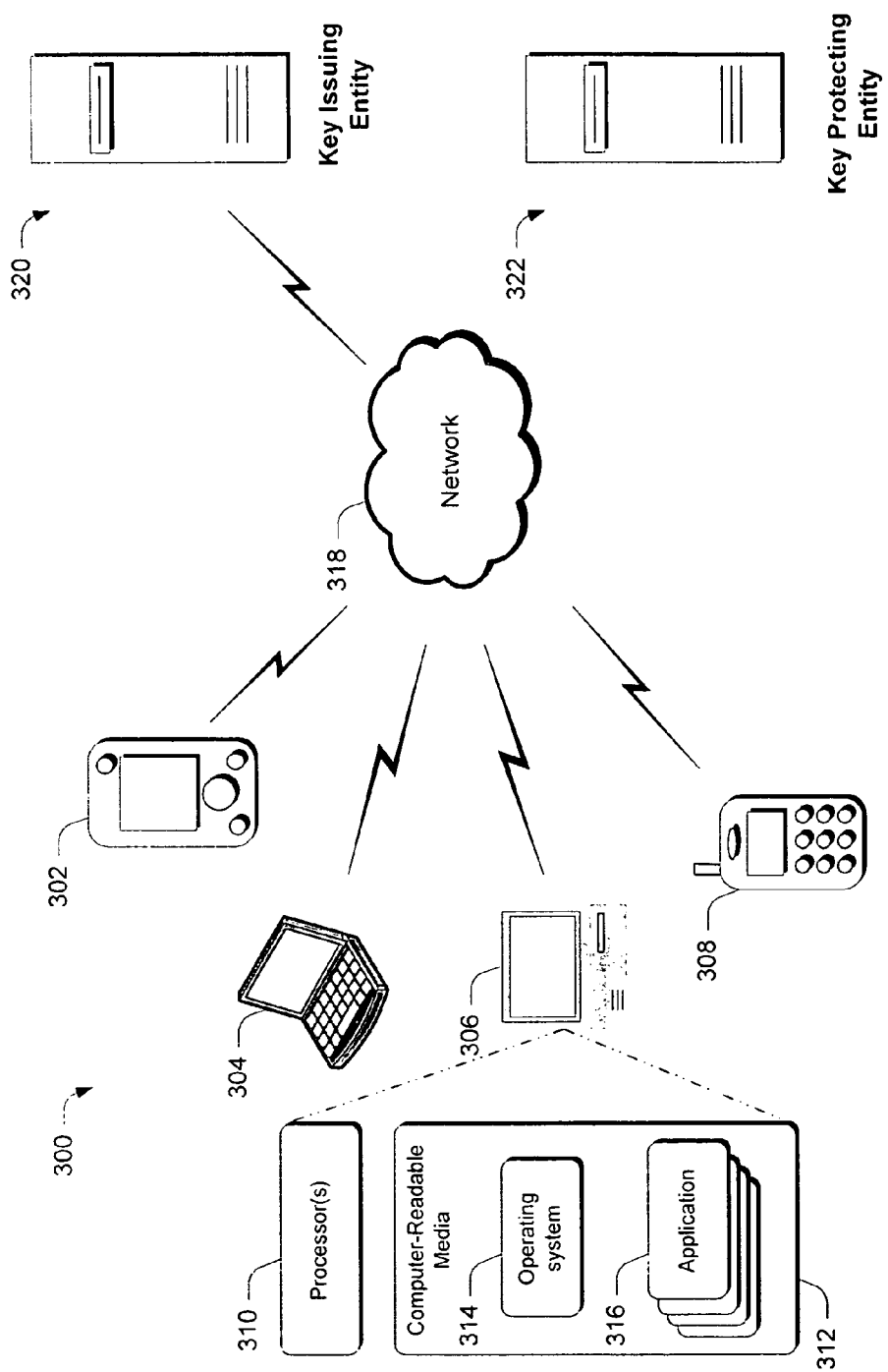
FIG. 3 illustrates an example environment in which various inventive principles can be employed in accordance with one or more embodiments.

FIG. 3 illustrates an example environment, generally at 300, in which various inventive principles can be employed in accordance with one or more embodiments.

Environment 300 includes multiple different computing devices examples of which are shown at 302, 304, 306, and 308. The computing devices can be used by various users to consume protected content examples of which can include textual content, video content, audio content, audio/visual content such as various types of multimedia content, games, and/or any type of digital content. Individual computing devices can typically include one or more processors 310, one or more computer-readable media 312, an operating system 314 and one or more applications 316 that reside on the computer-readable media and which are executable by the processor(s). Applications 316 can include an application that enables a user to consume protected content. Such application can include, by way of example and not limitation, a media playing application or any other type of application such as a game application, that can enable protected content to be consumed by a user.

The computer-readable media can include, by way of example and not limitation, all forms of volatile and non-volatile memory and/or storage media that are typically associated with a computing device. Such media can include ROM, RAM, flash memory, hard disk, removable media and the like. Any of the above-described computing devices, as well as others, can be considered as "client" devices and as such, assume the role of "client" in the discussion that follows.

In addition, environment 300 includes a network 318, such as a local network or the Internet, via which protected content and keys can be sent and received by various entities.

Environment 300 also includes a key issuing entity 320 and a key protecting entity 322. In this particular example, the key issuing and key protecting entities are embodied on different computing devices such as different servers. In at least some embodiments, the key issuing entity has no implied or explicit relationship with the key protecting entity other than the key protecting entity's key protection role. That is, in at least some embodiments, the key issuing entity and the key protecting entity are separate and unrelated entities. In this manner, the key issuing entity need not be concerned with or knowledgeable of the protections that are applied by the key protecting entity. Likewise, the key protecting entity need not be concerned with or knowledgeable of the purpose for which issued keys are used. Rather, each of the entities can, in at least some embodiments, operate generally independently of one another.

The client computing devices can be embodied as any suitable computing device such as, by way of example and not limitation, a desktop computer (such as computing device 306), a portable computer (such as computing device 304), a handheld computer such as a personal digital assistant (such as computing device 302), a cell phone (such as computing device 308), a set top box, a gaming device, and the like. One example of a computing device is shown and described below in relation to FIG. 6.

In at least some embodiments, computing devices 302, 304, 306, and 308 can comprise part of a domain such that protected content can be shared amongst the devices. For example, a single user may own each of the computing devices and, through the devices' domain relationship, may be able to freely transfer at least some protected content between the devices.

In the discussion that follows, the following terminology is used. A Key Protection Certificate is a certificate that is issued to clients. The certificate includes a public key which is associated with a private key known only to the key protecting entity 322. A Key Issuing Entity Certificate is a certificate that is issued to a key issuing entity 320 by the key protecting entity 322. The Key Issuing Entity Certificate certifies that the key issuing entity 320 may issue keys. A Domain Key Pair includes a domain private key and a domain public key. It is to be appreciated and understood that the key pair need not be domain bound. Accordingly, the techniques described below can be implemented in connection with a system that is not domain-centric.

Figure 4:
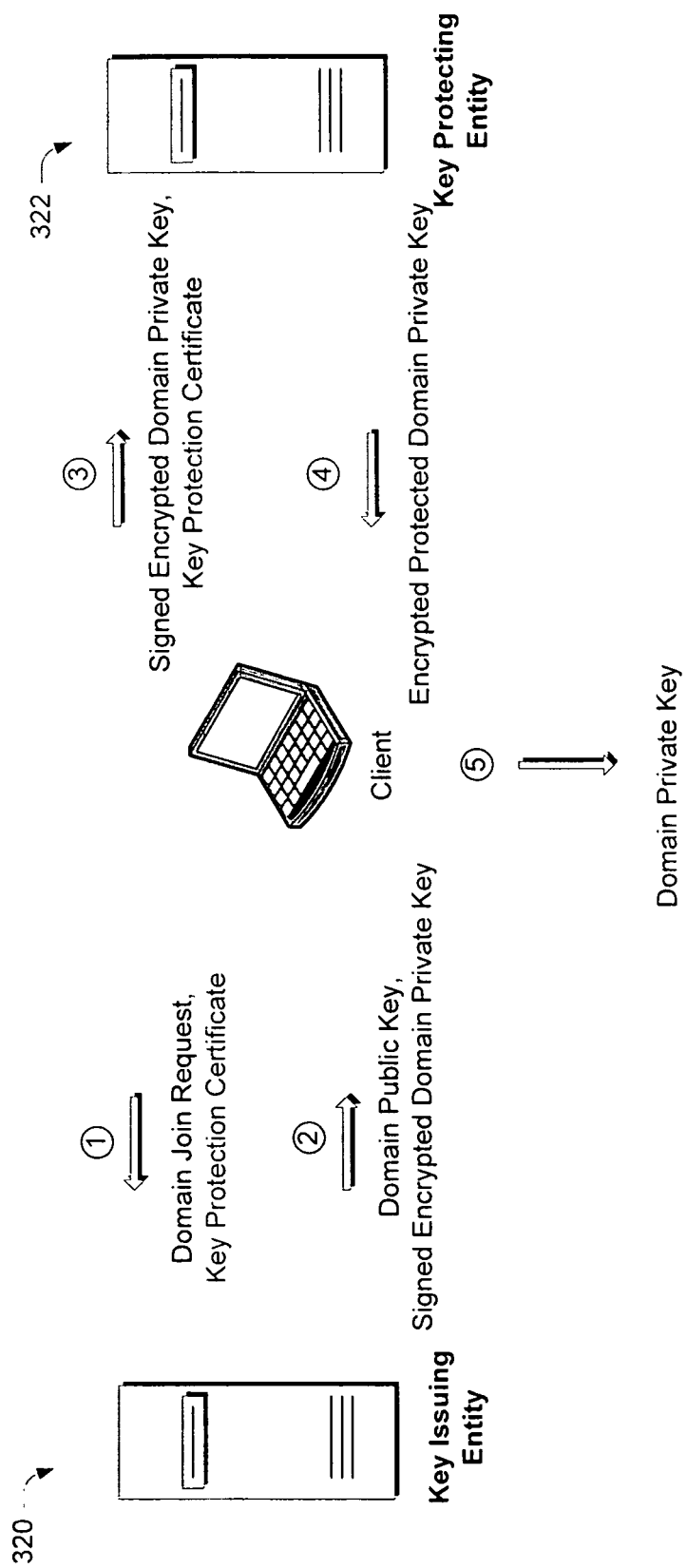
FIG. 4 illustrates an example flow between a client and various entities in accordance with one or more embodiments.

In operation and as illustrated in FIG. 4, the client sends a domain join request at "1" to the key issuing entity 320. In the domain join request, the client includes the Key Protection Certificate. Recall that the Key Protection Certificate includes the public key associated with the key protecting entity 322. The key issuing entity 320 receives the domain join request and, responsively, generates a domain key pair that includes a domain private key and a domain public key. The key issuing entity 320 verifies that the Key Protection Certificate was issued by the key protecting entity 322. The key issuing entity 320 then encrypts the domain private key to the Key Protection Certificate. Specifically, the key issuing entity 320 encrypts the domain private key using the public key of the key protecting entity 322.

The key issuing entity 320 then signs the encrypted domain private key with its Key Issuing Entity Certificate. The key issuing entity 320 then sends, at "2", the domain public key (in the form of a certificate) and the signed, encrypted domain private key to the client along with the remainder of the domain join response.

The client receives the domain join response and the included domain key pair. The client forwards, at "3", the signed encrypted domain private key to the key protecting entity 322 along with the Key Protection Certificate used to sign the encrypted key.

The key protecting entity 322 then verifies the signature of the signed, encrypted domain private key to ensure that it was signed by a valid Key Issuing Entity Certificate. The key protecting entity 322 then decrypts the encrypted domain private key using the private key portion of the Key Protection Certificate and recovers the issued domain private key. The key protecting entity 322 can then provide and apply any protection technologies to the domain private key. Once the protections have been applied, the protected domain private key is encrypted using the client's public key and returned, at "4" to the client.

When the client receives the encrypted, protected domain private key, it can decrypt the protected domain private key and, in at least some embodiments, reverse the protections that were applied to the domain private key. The client can then use the domain private key at "5" to consume protected content.

Example Method

Figure 5:
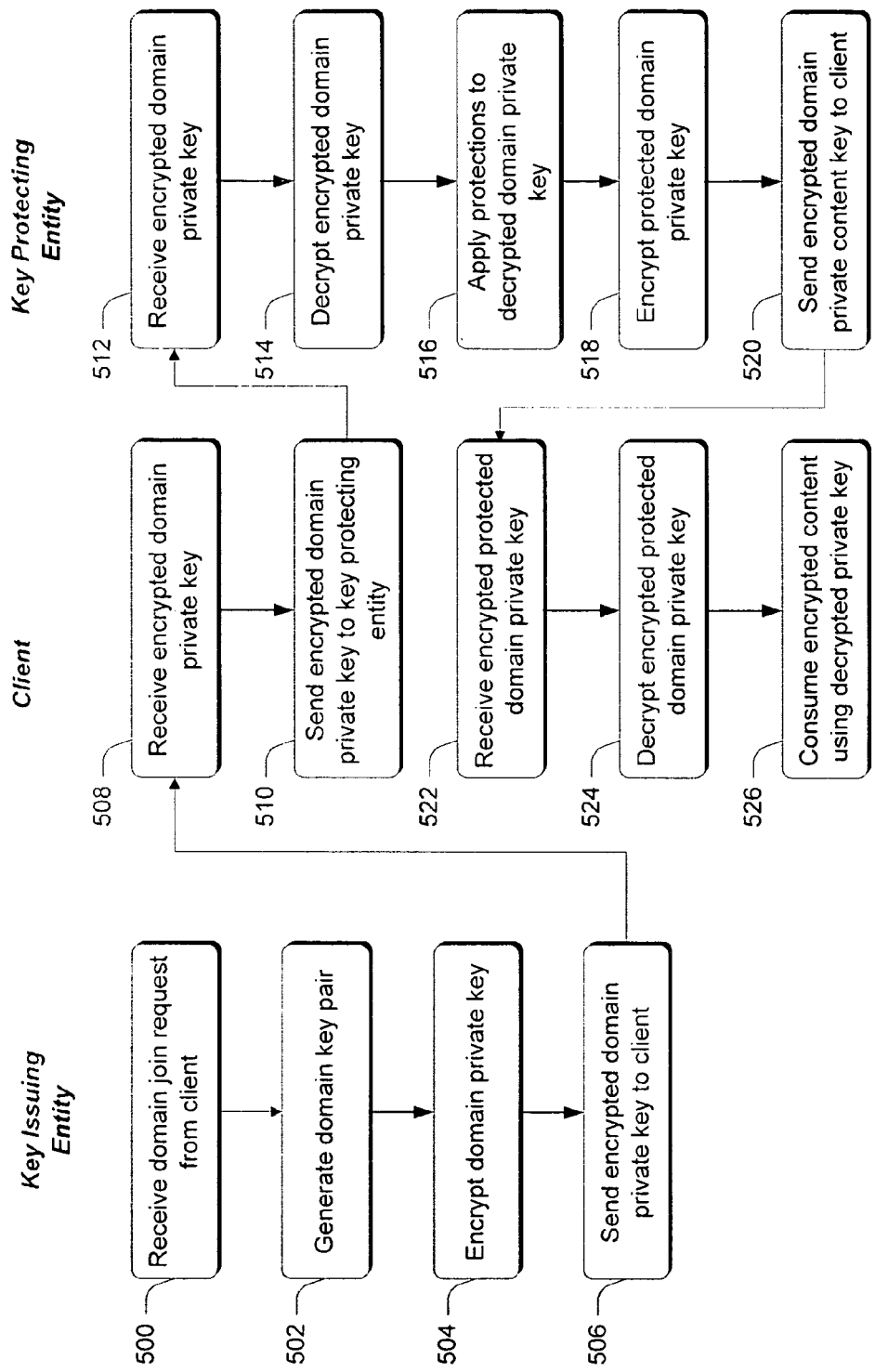
FIG. 5 illustrates a flow diagram that describes steps in the method in accordance with one or more embodiments.

FIG. 5 illustrates a flow diagram that describes steps in the method in accordance with one or more embodiments. The method can be implemented in connection with any suitable hardware, software, firmware, or combination thereof. In the description that follows, various steps of the method can be implemented or performed by various entities such as a key issuing entity, a client, and a key protecting entity, such as those that are illustrated and described in connection with FIG. 4. Accordingly, the various steps or acts that can be performed by these entities appear under similar designations in the flow diagram.

Step 500 receives a domain join request from the client indicating that the client wishes to consume content that has been protected or will be protected by a particular key. Step 502 generates or otherwise obtains a domain key pair. Step 504 encrypts a domain private key associated with the domain key pair. This step can be performed in any suitable way. For example, this step can be performed by encrypting the domain private key using a public key of the key protecting entity. Step 506 sends the encrypted domain private key to the client.

Step 508 receives the encrypted domain private key and step 510 sends the encrypted domain private key to the key protecting entity.

Step 512 receives the encrypted domain private key. Step 514 decrypts the encrypted domain private key using, for example, a private key associated with the public key with which the domain private key was encrypted. Step 516 applies protections to the decrypted domain private key. Step 518 encrypts the protected domain private key using, for example, a public key associated with the client. Step 520 sends the encrypted protected domain private key to the client.

Step 522 receives the encrypted protected domain private key. Step 524 decrypts the encrypted protected domain private key. This step can include reversing any protections that were applied by the key protecting entity at step 516. Step 526 then consumes encrypted content using the decrypted domain private key.

Extensions/Modifications

In one or more embodiments, the above-described process can be modified such that the encrypted domain private key is provided by the key issuing entity 320 (FIG. 3) directly to the key protecting entity 322. The key protecting entity 322 can operate upon the decrypted domain private key, re-encrypt it with the client's public key and send it back to the key issuing entity 320. Because the domain private key has been encrypted with the client's public key, the key issuing entity 320 cannot access in the domain private key or become knowledgeable of the protections that have been applied to it by key protecting entity 322. The key issuing entity 320 can then send the encrypted domain private key to the client so that the client can consume content that has been protected by the domain private key.

Alternately or additionally, upon receiving the encrypted domain private key from the key issuing entity 320, the key protecting entity 322 can operate upon the decrypted domain private key, re-encrypt it with the client's public key, and send the encrypted, protected domain private key directly to the client.

The above-described processes can be utilized any time a content key or, in the example just above, a domain private key is issued or reissued. In addition, the above-described techniques can be utilized to provide protections to any type of key when a third-party wishes to issue a key that it wants to be protected. By implementing protections independent of the key issuing entity, the key issuing entity can be relieved from the burden of applying protections and remaining up to date with current protection technologies.

Having described various embodiments in which third-party keys can be protected by unrelated key protecting entities, consider now an example system that can be utilized to implement a client or client device.

Example System

Figure 6:
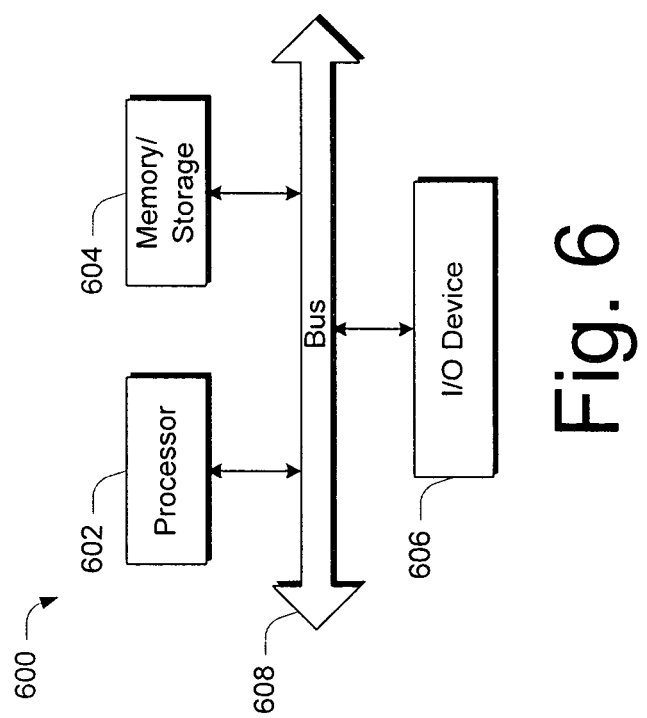
FIG. 6 is a block diagram of an example system that can be utilized to implement one or more embodiments.

FIG. 6 illustrates an example computing device 600 that can implement the various embodiments described above. Computing device 600 can be, for example, various computing device or servers, such as those illustrated in FIG. 3 or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

A protocol is provided that permits a third-party key issuing entity to have its issued keys protected by an unrelated key protecting entity. In at least some embodiments, a trusted key protecting entity is injected, in a sense, in a conversation between the third-party key issuing entity and a client to which one or more keys are distributed. The trusted key protecting entity is able to apply various protections which, in at least some embodiments are unknown to the key issuing entity, to a distributed key which can then be used by the client to access protected content.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving, with a key protecting entity, a content key associated with distributed content accessible by a client device that has been protected by a key issuing entity, the key issuing entity being unrelated to the key protecting entity, the key protecting entity not configured to generate its own respective content keys;
unprotecting, with the key protecting entity, the protected content key;
applying, with the key protecting entity, protections to the content key to provide a protected content key;
encrypting, with the key protecting entity, the protected content key to provide an encrypted, protected content key, wherein the act of encrypting is performed by encrypting the protected content key using a public key of the client device; and
sending, automatically and without user intervention with the key protecting entity, the encrypted, protected content key to the client device, the encrypted, protected content key configured to permit access to the distributed content.

2. The method of claim 1, wherein the key issuing entity is associated with a business entity that is different from and/or unaffiliated with the key protecting entity.

3. The method of claim 1, wherein the key issuing entity is unaware of specific protections that are applied by the key protecting entity.

4. The method of claim 1, wherein the key issuing entity is unable to ascertain protections that are applied by the key protecting entity.

5. The method of claim 1, wherein the protections that are applied are knowledgeable by software on the client device.

6. The method of claim 1, wherein the content key comprises a domain private key.

7. The method of claim 1, wherein the key issuing entity and key protecting entity are embodied on different computing devices.

8. The method of claim 1, wherein the key issuing entity and key protecting entity are embodied on a same computing device.

9. The method of claim 1, wherein the client device comprises part of a domain that can share protected content associated with the content key.

10. The method of claim 1, wherein the protections to the content key include having a mathematical transform applied to it.

11. The method of claim 1, wherein the protections to the content key include splitting the content key into multiple parts to manipulate the content key.

12. The method of claim 1, wherein the protections to the content key include applying a cryptographic transform to the content key.

13. A system comprising:
   one or more computer-readable storage media devices;
   computer-readable instructions on the one or more computer-readable storage media devices which, when executed, implement a method comprising:
      receiving, with a key protecting entity and via the Internet, an encrypted domain private key, the encrypted domain private key comprising part of a domain key pair used to encrypt content for consumption on one or more clients and being received from a key issuing entity that is unrelated to the key protecting entity and associated with a business entity unaffiliated with the key protecting entity, the key protecting entity not configured to generate domain keys used to encrypt content;
      decrypting the encrypted domain private key;
      applying protections to the decrypted domain private key to provide a protected domain private key; and
      encrypting the protected domain private key to provide an encrypted, protected domain private key, said encrypting using a public key associated with a client that is to receive the encrypted, protected domain private key.

14. The system of claim 13 further comprising sending the encrypted, protected domain private key to the client via the Internet.

15. The system of claim 13, wherein the key issuing entity is unaware of specific protections that are applied by the key protecting entity.

16. The system of claim 13 further comprising sending the encrypted, protected domain private key to the client via the Internet.

17. The system of claim 13 further comprising sending the encrypted, protected domain private key to the key issuing entity from which the encrypted domain private key was received.

18. The system of claim 13, wherein said receiving is performed by receiving said encrypted domain private key from the client.

19. The system of claim 13, wherein said receiving comprises receiving said encrypted domain private key from the key issuing entity, wherein said encrypted domain private key is signed by the key issuing entity.

20. The system of claim 19 further comprising verifying a signature associated with the encrypted domain private key.

* * * * *